(12) United States Patent
Furuta et al.

(10) Patent No.: US 10,491,732 B2
(45) Date of Patent: Nov. 26, 2019

(54) RADIO COMMUNICATION DEVICE

(71) Applicant: JVC KENWOOD Corporation, Yokohama-shi, Kanagawa (JP)

(72) Inventors: Hiroshi Furuta, Yokohama (JP); Shinichiro Wakamatsu, Yokohama (JP); Yoshihiro Suzuki, Yokohama (JP); Kanji Kuroiwa, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 16/178,890

(22) Filed: Nov. 2, 2018

(65) Prior Publication Data

US 2019/0199843 A1  Jun. 27, 2019

(30) Foreign Application Priority Data

Dec. 27, 2017  (JP) .................. 2017-250535

(51) Int. Cl.

| H04M 1/60 | (2006.01) |
| H04M 1/725 | (2006.01) |
| H04R 29/00 | (2006.01) |
| H04R 3/00 | (2006.01) |
| H04W 4/10 | (2009.01) |

(52) U.S. Cl.
CPC ....... H04M 1/605 (2013.01); H04M 1/72569 (2013.01); H04R 3/007 (2013.01); H04R 29/004 (2013.01); H04W 4/10 (2013.01)

(58) Field of Classification Search
CPC .................................. H04B 1/46; H04W 4/10
See application file for complete search history.

(56) References Cited

U.S. PATENT DOCUMENTS

| 4,160,125 A | * | 7/1979 | Bower | ..................... H04M 3/46 |
| | | | | 379/357.04 |
| 5,563,952 A | * | 10/1996 | Mercer | ..................... H04B 1/46 |
| | | | | 381/110 |
| 2017/0006395 A1 | * | 1/2017 | Loo | ......................... H04R 1/04 |

FOREIGN PATENT DOCUMENTS

JP          3919697 B2    5/2007

* cited by examiner

*Primary Examiner* — Hsinchun Liao
(74) *Attorney, Agent, or Firm* — Nath, Goldberg & Meyer; Jerald L. Meyer; Stanley N. Protigal

(57) ABSTRACT

A transmitter modulates an input voice signal to transmit an RF signal. A receiver demodulates a received RF signal to output an output voice signal. A voice level comparator compares a level of an input voice signal obtained by collecting a voice by a microphone with a VOX sensitivity level. A transmission determination unit instructs the transmitter to transmit the input voice signal, when the level of the input voice signal is equal to or greater than the VOX sensitivity level, based on a comparison result by the voice level comparator. A VOX sensitivity level calculator calculates the VOX sensitivity level in a predetermined period until just before the receiver completes outputting the output voice signal, based on an ambient sound collected by the microphone.

2 Claims, 5 Drawing Sheets

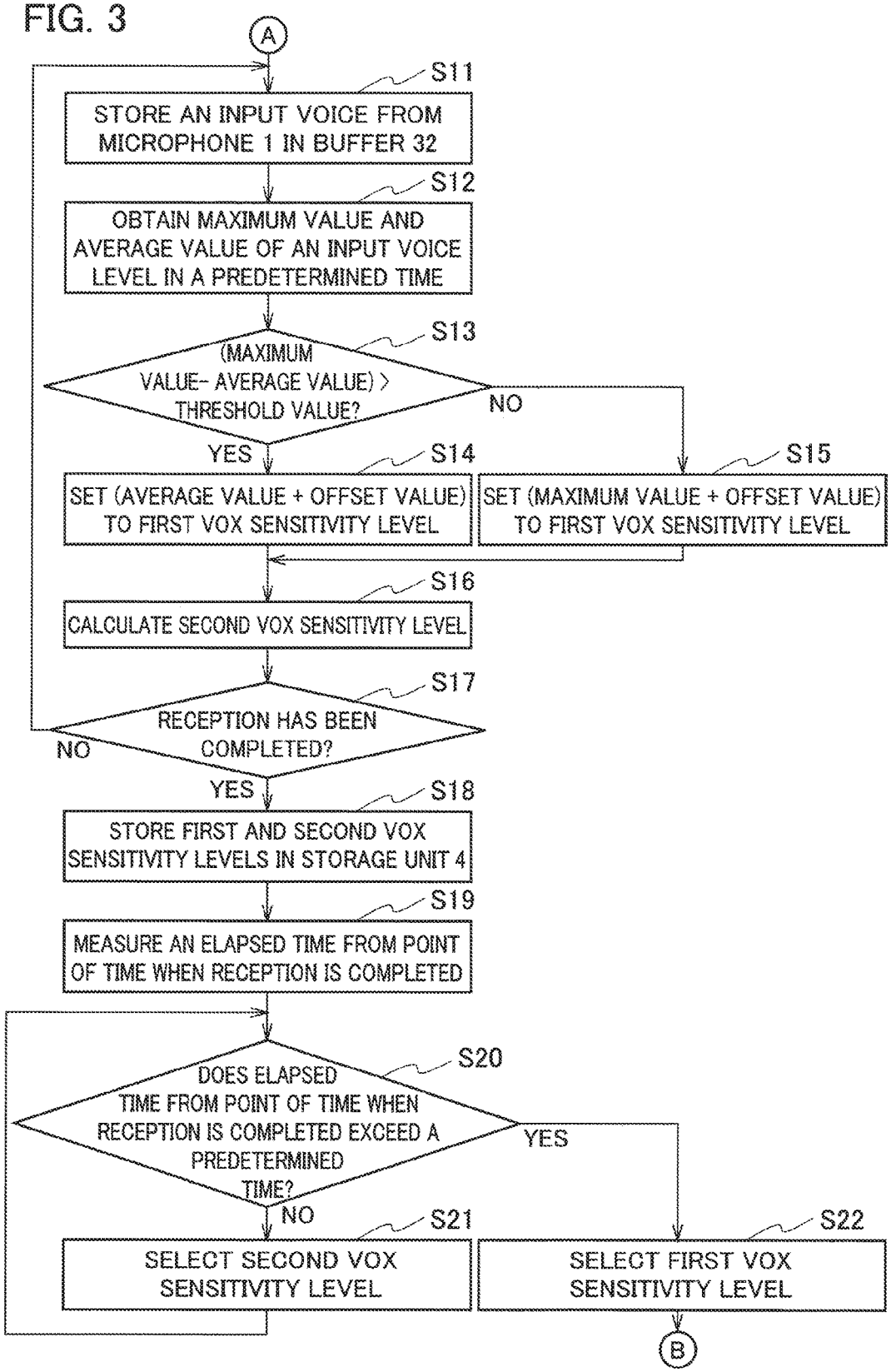

RADIO COMMUNICATION DEVICE

CROSS REFERENCE TO RELATED APPLICATION

This application is based upon and claims the benefit of priority under 35 U.S.C. § 119 from Japanese Patent Application No. 2017-250535 filed on Dec. 27, 2017, the entire contents of which are incorporated herein by reference.

BACKGROUND

The present disclosure relates to a radio communication device provided with a Voice-operated Transmit (VOX) function.

In a radio communication device that adopts a half-duplex communication method, the radio communication device is switched to a transmission state by pressing a Push-to-talk (PTT) switch, and the radio communication device is switched to a standby state for reception by releasing the pressing of the PTT switch.

In addition, in order to achieve a hands-free call, the radio communication device may sometimes be provided with a so-called VOX function to switch the radio communication device to the transmission state when a microphone collects a voice of a predetermined level or more (see Japanese Patent No. 3919697).

SUMMARY

In the radio communication device provided with the VOX function, the microphone must collect such a voice of a predetermined level or more in order to activate the VOX function. Accordingly, a user has needed to talk while being conscious of the level of the voice, at which the VOX function is activated. For example, the user has needed to be conscious of starting a call intentionally at a high volume at the time of wishing to start transmission.

Accordingly, a radio communication device is desired to appear, which is capable of naturally making a call without being conscious of the level of the voice at the time of starting the call, like a cellular phone that adopts a full-duplex communication method. At this time, it is desired that the VOX function is operated without being conscious of the level of the ambient sound.

An aspect of one or more embodiments provides a radio communication device including: a transmitter configured to modulate an input voice signal to transmit an RF signal; a receiver configured to demodulate a received RF signal to output an output voice signal; a voice level comparator configured to compare a level of an input voice signal obtained by collecting a voice by a microphone with a VOX sensitivity level; a transmission determination unit configured to instruct the transmitter to transmit the input voice signal, when the level of the input voice signal is equal to or greater than the VOX sensitivity level, based on a comparison result by the voice level comparator; and a VOX sensitivity level calculator configured to calculate the VOX sensitivity level in a predetermined period until just before the receiver completes outputting the output voice signal, based on an ambient sound collected by the microphone.

BRIEF DESCRIPTION OF THE DRAWINGS

FIG. 3 is a flowchart illustrating operations during reception by a radio communication device according to one or more embodiments.

DETAILED DESCRIPTION

Figure 1:
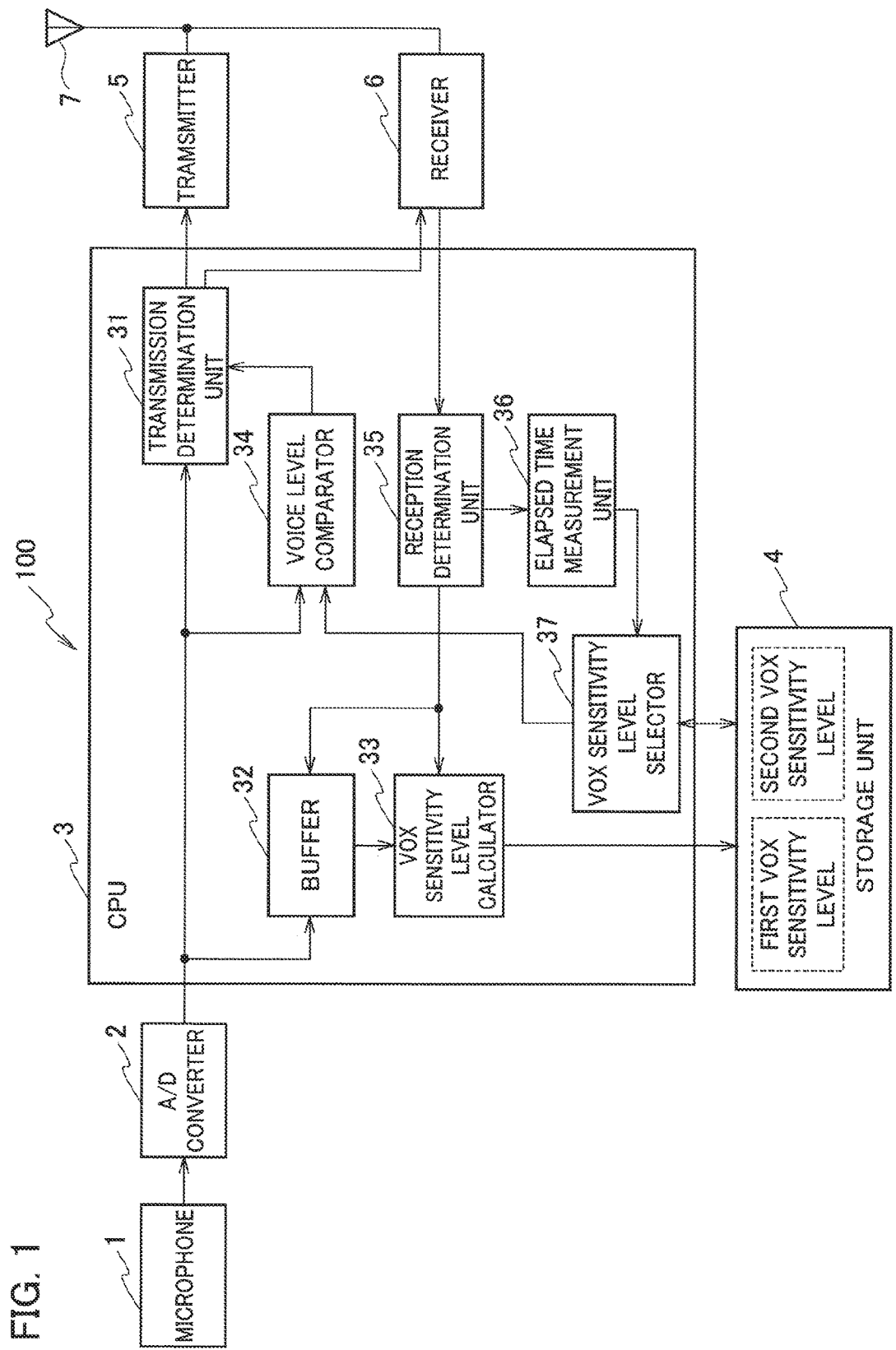
FIG. 1 is a block diagram illustrating a radio communication device according to one or more embodiments.

A description will be given of a radio communication device 100 according to one or more embodiments with reference to accompanying drawings. As shown in FIG. 1, the radio communication device 100 includes a microphone 1, an A/D converter 2, a central processing unit (hereinafter, CPU) 3, a storage unit 4, a transmitter 5, a receiver 6, and an antenna 7 for transmission and reception. The storage unit 4 is a nonvolatile memory, and for example, is an Electrically Erasable Programmable Read-only Memory (EEPROM). In FIG. 1, a PTT switch is not shown. The microphone 1 may be detachable from the radio communication device 100.

The microphone 1 collects a voice emitted by a user, and supplies an analog input voice signal to the A/D converter 2. The A/D converter 2 converts the analog input voice signal into a digital input voice signal (A/D conversion), and supplies the digital input voice signal to the CPU 3.

The transmitter 5 modulates the input voice signal detected by the microphone 1 with a predetermined modulation method, converts it into an RF signal, and transmits the RF signal from the antenna 7. The receiver 6 demodulates the RF signal detected by the antenna 7 to generate an output voice signal, and voices are output from an electroacoustic transducer such as an unillustrated speaker or earphones.

The CPU 3 includes a transmission determination unit 31, a buffer 32, a VOX sensitivity level calculator 33, a voice level comparator 34, a reception determination unit 35, an elapsed time measurement unit 36, and a VOX sensitivity level selector 37.

The respective units from the transmission determination unit 31 to the VOX sensitivity level selector 37 are composed as functions by software executed by the CPU 3; however, the respective units from the transmission determination unit 31 to the VOX sensitivity level selector 37 may be composed of hardware such as circuits or the like. Choice of the hardware and the software is arbitrary.

The input voice signal output from the A/D converter 2 is supplied to the transmission determination unit 31, the buffer 32, and the voice level comparator 34. The reception determination unit 35 determines whether or not the receiver 6 is receiving the RF signal. That is, the reception determination unit 35 determines whether the receiver 6 demodulates the RF signal and is outputting an output voice signal, or completes outputting the output voice signal. For example, the reception determination unit 35 may determine whether the receiver 6 is outputting the output voice signal, or completes outputting the output voice signal, by a noise squelch.

When the receiver 6 is in a reception state, that is, when the receiver 6 is outputting the output voice signal, the buffer 32 stores the input voice signal output from the A/D converter 2 for a predetermined time. In other words, the input voice signal detected by the microphone 1 when the receiver 6 is in a reception state is an ambient sound, and the buffer 32 stores the ambient sound when the receiver 6 is in a reception state. After the receiver 6 completes reception, the VOX sensitivity level calculator 33 calculates a VOX sensitivity level based on the level of the input voice signal of the ambient sound read from the buffer 32, as will be described later. Specifically, the VOX sensitivity level calculator 33 calculates a first VOX sensitivity level, and a second VOX sensitivity level which is smaller than the first VOX sensitivity level.

The buffer 32 only needs to have at least a capacity for storing the input voice signal for a predetermined time necessary for the VOX sensitivity level calculator 33 to calculate the VOX sensitivity level. The buffer 32 updates and stores the input voice signal so as to store the input voice signal of the latest predetermined time. That is, the buffer 32 stores the ambient sound of a predetermined time until the receiver 6 completes reception.

When the VOX sensitivity level calculator 33 calculates a VOX sensitivity level, the microphone 1 is set so as not to collect the voice received by the receiver 6. As an example, the user listens to the voice output from the receiver 6 using a headset, thereby, the microphone 1 does not collect the voice output from the receiver 6, and can collect only the ambient sound (environmental sound). In a case where a speaker outputs the voice received by the receiver 6, the microphone 1 may be configured to collect a sound in which the voice output from the speaker is canceled.

In this way, the VOX sensitivity level calculator 33 calculates a VOX sensitivity level based on the level of the input voice signal that the microphone 1 collects the ambient sound. That is, the VOX sensitivity level is varied according to the level of the ambient sound.

The first and second VOX sensitivity levels are supplied to and stored in the storage unit 4. When the reception determination unit 35 determines that the reception has been completed, the elapsed time measurement unit 36 measures an elapsed time from the point of time when the reception is completed. The VOX sensitivity level selector 37 selects to read the second VOX sensitivity level from the storage unit 4, and supplies it to the voice level comparator 34, until the elapsed time measured by the elapsed time measurement unit 36 reaches a predetermined time. The VOX sensitivity level selector 37 selects to read the first VOX sensitivity level from the storage unit 4, and supplies it to the voice level comparator 34, when the elapsed time measured by the elapsed time measurement unit 36 exceeds the predetermined time.

The voice level comparator 34 compares the level of the input voice signal output from the A/D converter 2 (an input voice level) with the VOX sensitivity level (either the first VOX sensitivity level or the second VOX sensitivity level) supplied from the VOX sensitivity level selector 37. The voice level comparator 34 supplies the comparison result to the transmission determination unit 31.

The transmission determination unit 31 supplies the input voice signal, and instructs the transmitter 5 to transmit the input voice signal, if the level of the input voice signal output from the A/D converter 2 is equal to or greater than the VOX sensitivity level supplied from the VOX sensitivity level selector 37, based on the comparison result. The transmitter 5 encodes and modulates the input voice signal, and transmits it from the antenna 7. Moreover, the transmission determination unit 31 instructs the receiver 6 to stop the reception operation, when it instructs the transmitter 5 to transmit the input voice signal.

As described above, the first VOX sensitivity level and the second VOX sensitivity level have a relationship of: first VOX sensitivity level>second VOX sensitivity level. That is, if the radio communication device 100 determines whether or not a voice collected by the microphone 1 is at a predetermined level or more with the second VOX sensitivity level taken as a reference, then the VOX function will be activated at a relatively small volume. Therefore, it is possible to increase the sensitivity of the VOX function.

If the radio communication device 100 determines whether or not a voice collected by the microphone 1 is at a predetermined level or more with the first VOX sensitivity level taken as a reference, then the VOX function will be activated at a higher volume than in the case where the second VOX sensitivity level is taken as a reference. Therefore, it is possible to decrease the sensitivity of the VOX function.

Figure 2:
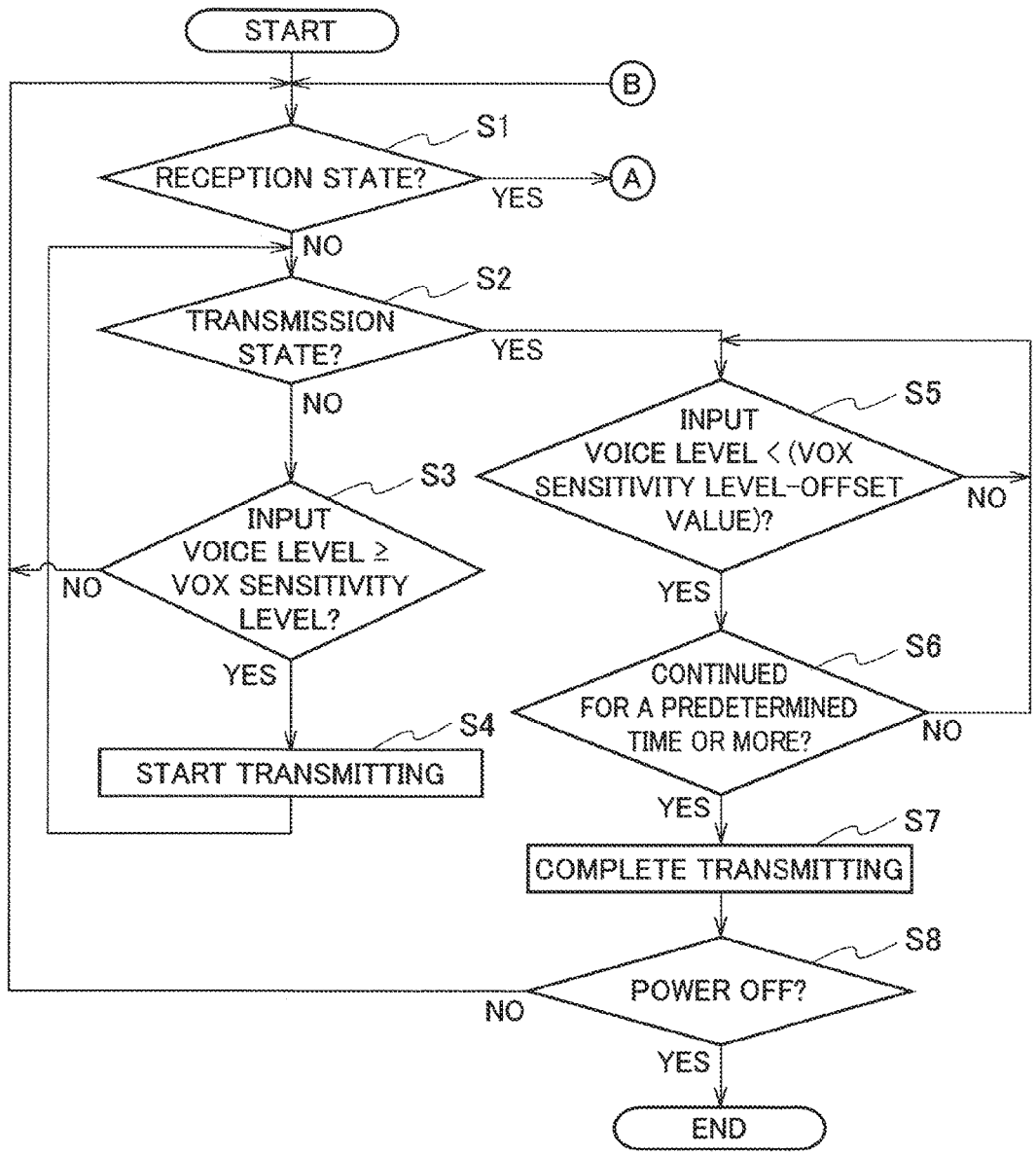
FIG. 2 is a flowchart illustrating operations relating to voice transmission processing by a radio communication device according to one or more embodiments.

By using flowcharts shown in FIGS. 2 and 3 and the conceptual diagrams shown in FIGS. 4A and 4B, a further detailed description will be given of the radio communication device 100. In FIG. 2, when an unillustrated power supply is turned on and the radio communication device 100 starts operation, the CPU 3 (the reception determination unit 35) determines whether or not it is in a reception state in step S1. If it is in a reception state (YES), the CPU 3 executes the processing shown in FIG. 3, and returns the processing to step S1.

If it is not in a reception state (NO), the CPU 3 (the transmission determination unit 31) determines whether or not it is in a transmission state in step S2. If it is not in a transmission state (NO), the CPU 3 (the voice level comparator 34) determines whether or not the input voice level is equal to or greater than the VOX sensitivity level in step S3. Here, the VOX sensitivity level is the first VOX sensitivity level or the second VOX sensitivity level. If the input voice level is not equal to or greater than the VOX sensitivity level (NO), the CPU 3 returns the processing to step S1.

If the input voice level is equal to or greater than the VOX sensitivity level (YES), the CPU 3 (the transmission determination unit 31) starts transmitting the input voice signal in step S4, and returns the processing to step S2.

If it is in a transmission state in step S2 (YES), the CPU 3 (the voice level comparator 34) determines whether or not the input voice level is less than the level obtained by subtracting a predetermined offset value from the VOX sensitivity level. Hereinafter, the level is referred to as (VOX sensitivity level-offset value) level. Here, the VOX sensitivity level is the first VOX sensitivity level or the second VOX sensitivity level.

If the input voice level is less than the (VOX sensitivity level-offset value) level (YES), the CPU 3 (the voice level comparator 34) determines whether or not a state in which the input voice level is less than the (VOX sensitivity level-offset value) level has continued for a predetermined time or more in step S6. If the state in which the input voice level is less than the (VOX sensitivity level-offset value) level has not continued for a predetermined time or more (NO), the CPU 3 (the voice level comparator 34) returns the processing to step S5.

If the state, in which the input voice level is less than the (VOX sensitivity level-offset value) level, has continued for a predetermined time or more in step S6 (YES), the CPU 3 (the transmission determination unit 31) completes transmitting the input voice signal in step S7.

The reason why it is determined whether or not the input voice level is less than the (VOX sensitivity level-offset value) level in step S5, is to terminate the transmission in a state where it is almost certainly determined that the call has been completed, without terminating the transmission even when the state in which the input voice level is less than the VOX sensitivity level has continued for a predetermined time or more.

Note that if the predetermined time in step S6 is lengthened, the offset value in step S5 can be set to a small value or to zero. The offset in step S5 may be set to an appropriate value.

Following step S7, the CPU 3 determines whether or not the power supply has been turned off in step S8. If the power supply has not been turned off (NO), the CPU 3 set the radio communication device 100 as the standby state for reception, and returns the processing to step S1. If the power supply has been turned off (YES), the CPU 3 terminates the operation of the radio communication device 100.

Next, by using FIG. 3, a description will be given of the operation when it is determined that it is in a reception state in step S1. In FIG. 3, the CPU 3 stores an input voice from the microphone 1 (the input voice signal output from the A/D converter 2) in step S11. That is, the CPU 3 stores the ambient sound in the reception state as the input voice. The CPU 3 (the VOX sensitivity level calculator 33) obtains the maximum value and the average value of the input voice level in a predetermined time in step S12.

The CPU 3 (the VOX sensitivity level calculator 33) determines whether or not the subtraction value obtained by subtracting the average value from the maximum value exceeds a predetermined threshold value in step S13. If the subtraction value exceeds the threshold value (YES), the CPU 3 (the VOX sensitivity level calculator 33) sets the added value obtained by adding the predetermined offset value to the average value to the first VOX sensitivity level in step S14. If the subtraction value does not exceed the threshold value (NO), the CPU 3 (the VOX sensitivity level calculator 33) sets the added value obtained by adding the predetermined offset value to the maximum value to the first VOX sensitivity level in step S15.

Figure 4A:
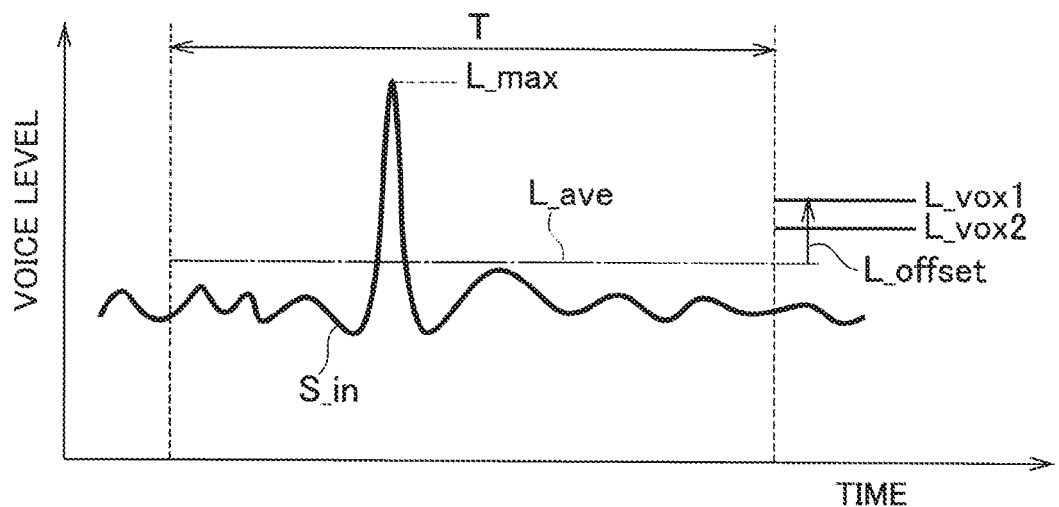
FIG. 4A is a diagram conceptually illustrating a first setting method of a VOX sensitivity level by a radio communication device according to one or more embodiments.

FIG. 4A conceptually shows the processing of step S14 which is the first setting method of the VOX sensitivity level. In FIGS. 4A, 4B, and 5, S_in indicates the input voice signal input to the CPU 3. In FIG. 4A, it is assumed that the subtracted value obtained by subtracting the average value L_ave from the maximum value L_max of the input voice level exceeds the threshold value in a preset time T. When the subtracted value exceeds the threshold value as shown in FIG. 4A, the maximum value L_max is considered to be instantaneous peak noise, and it is not preferable to set the first VOX sensitivity level L_vox1 with reference to the maximum value L_max.

Therefore, the VOX sensitivity level calculator 33 sets the added value obtained by adding a predetermined offset value L_offset to the average value L_ave to the first VOX sensitivity level L_vox1. The offset value L_offset may be set to an appropriate value.

Figure 4B:
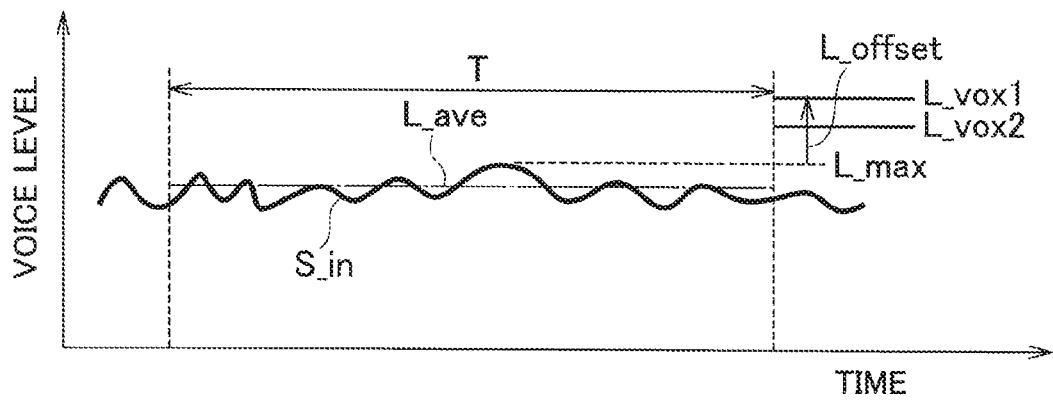
FIG. 4B is a diagram conceptually illustrating a second setting method of a VOX sensitivity level by a radio communication device according to one or more embodiments.
Figure 5:
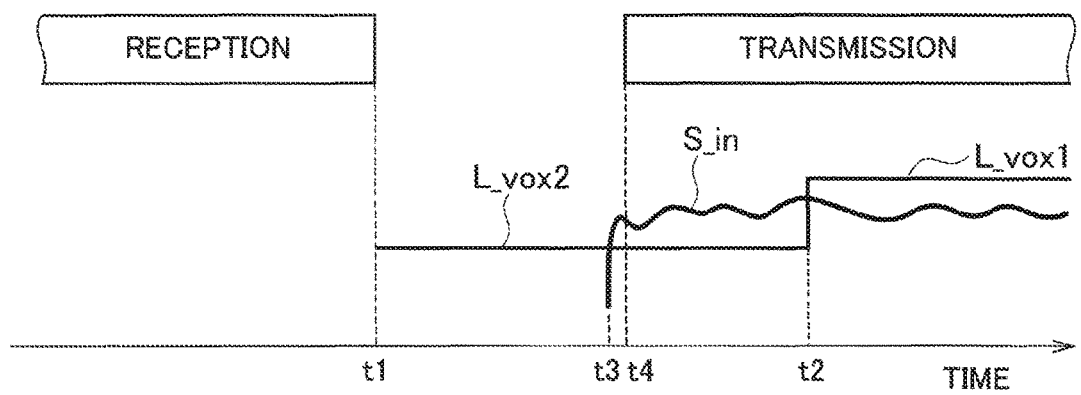
FIG. 5 is a diagram conceptually illustrating an example of an operation when a radio communication device according to one or more embodiments starts transmission after reception is completed.

FIG. 4B conceptually shows the processing of step S15 which is the second setting method of the VOX sensitivity level. In FIG. 4B, it is assumed that the subtracted value obtained by subtracting the average value L_ave from the maximum value L_max of the input voice level does not exceed the threshold value in the time T. When the subtracted value does not exceed the threshold value as shown in FIG. 4B, the maximum value L_max is not a peak noise, and it is preferable to set the first VOX sensitivity level L_vox1 with reference to the maximum value L_max.

Therefore, the VOX sensitivity level calculator 33 sets the added value obtained by adding the offset value L_offset to the maximum value L_max to the first VOX sensitivity level L_vox1.

When the VOX sensitivity level calculator 33 obtains the maximum value and the average value in the time T, the time T may be divided every unit time, the maximum value per unit time may be obtained, the average value of all of the maximum values may be taken as the average value in the time T, and the maximum value among all of the maximum values may be the maximum value in the time T.

Returning to FIG. 3, the CPU 3 (the VOX sensitivity level calculator 33) calculates the second VOX sensitivity level which is smaller than the first VOX sensitivity level in step S16. As shown in FIGS. 4A and 4B, by the processing in step S16, the second VOX sensitivity level L_vox2 which is smaller than the first VOX sensitivity level L_vox1. The second VOX sensitivity level L_vox2 is an added value obtained by adding an offset value smaller than the offset value L_offset to the average value L_ave or the maximum value L_max.

In FIG. 3, the CPU 3 (the reception determination unit 35) determines whether or not the reception has been completed 16 in step S17. If the reception has not been completed (NO), the CPU 3 returns the processing to step S1, and repeats the processing from step S11 to step S17. Accordingly, the radio communication device 100 repeats the processing of calculating the first VOX sensitivity level L_vox1 and the second VOX sensitivity level L_vox2 at each time T during the reception.

If the reception has been completed in step S17 (YES), the CPU 3 (the VOX sensitivity level calculator 33) stores the first VOX sensitivity level L_vox1 and the second VOX sensitivity level L_vox2 in the storage unit 4 in step S18. The storage unit 4 stores the first VOX sensitivity level L_vox1 and the second VOX sensitivity level L_vox2 that are calculated at the time T just before the reception is completed.

That is, the first VOX sensitivity level L_vox1 and the second VOX sensitivity level L_vox2 stored in the storage unit 4 are VOX sensitivity levels that are set according to the level of the ambient sound immediately before the reception is completed.

The CPU 3 (the elapsed time measurement unit 36) measures an elapsed time from the point of time when the reception is completed in step S19. The CPU 3 (the elapsed time measurement unit 36) determines whether or not the measured elapsed time from the point of time when the reception is completed exceeds a predetermined time in step S20. If the measured elapsed time does not exceed the predetermined time (NO), the CPU 3 (the VOX sensitivity level selector 37) selects the second VOX sensitivity level L_vox2 in step S21, and returns the processing to step S20.

If the measured elapsed time exceeds the predetermined time (YES), the CPU 3 (the VOX sensitivity level selector 37) selects the first VOX sensitivity level L_vox1 in step S22, and returns the processing to step S1 of FIG. 2.

By the processing shown in FIG. 3 as described above, the VOX sensitivity level that is compared to the input voice level in steps S3 and S5 of FIG. 2 is the second VOX sensitivity level L_vox2 within the predetermined time from the time when the receiver 6 completes the reception, and the VOX sensitivity level is the first VOX sensitivity level L_vox1 after exceeding the predetermined time.

By using FIG. 5, a description will be given of an example of the operation when the radio communication device 100 starts transmitting after completing a reception. In FIG. 5, the radio communication device 100 completes the reception at the time t1. As described before, the CPU 3 calculates the first VOX sensitivity level L_vox1 and the second VOX sensitivity level L_vox2, and stores them in the storage unit 4 during reception before the time t1. The CPU 3 selects the second VOX sensitivity level L_vox2 during the time from the time t1 to the time t2, and selects the first VOX sensitivity level L_vox1 after the time t2.

The user starts a call for transmission at a predetermined volume at the time t3 between the time t1 and the time t2. Immediately after that, since the input voice level to the CPU 3 exceeds the second VOX sensitivity level L_vox2, the VOX function operates at the time t4, and the radio communication device 100 transmits the input voice signal.

In a predetermined time after the time t1 in FIG. 5, the user is likely to try to transmit in order to respond and start a call. Since the second VOX sensitivity level L_vox2 is selected during the time from the time t1 to the time t2, the user does not need to start a call intentionally at a high volume, and can start a call at a normal volume. Therefore, the user does not need to talk at an unnaturally high volume, and is able to have a natural conversation with the communication partner, when the user starts a call without much time after the reception from the communication partner is ended.

The fact that the elapsed time after completing the reception exceeds the predetermined time indicates a state in which the conversation with the communication partner is temporarily ended. The first VOX sensitivity level L_vox1 is selected at this time. Accordingly, the user speaks at a high volume intentionally when intending to resume the call, thereby activating the VOX function to make it possible to resume the call.

Note that, when the radio communication device 100 always uses the second VOX sensitivity level L_vox2, the VOX function is activated at a relatively low volume, and a malfunction may possibly occur. Hence, it is not preferable to always use the second VOX sensitivity level L_vox2. A time of using the second VOX sensitivity level L_vox2 is limited such that the elapsed time after completion of reception is within a predetermined time. Therefore, the user can have a natural conversation with the communication partner while preventing an occurrence of the malfunction.

In addition, according to the radio communication device 100, since the VOX sensitivity level is varied according to the level of the ambient sound, it is possible to set the optimum VOX sensitivity level according to the level of the ambient sound. Therefore, it is possible to prevent a malfunction such that the VOX function is activated due to the ambient sound even though the user does not generate a voice. The user only needs to talk at a small volume in an environment where the ambient sound is small, and it is not necessary to talk at a high volume.

As described above, in accordance with the radio communication device 100 according to one or more embodiments, it is not necessary to be conscious of the voice level at which the VOX function is activated and the level of the ambient sound, and the user can start a call at a normal volume when a conversation with the communication partner is continuing.

The present invention is not limited to one or more embodiments described above, and various modifications can be made without departing from the scope of the invention.

What is claimed is:

1. A radio communication device comprising:
a transmitter configured to modulate an input voice signal to transmit an RF signal;
a receiver configured to demodulate a received RF signal to output an output voice signal;
a voice level comparator configured to compare a level of an input voice signal obtained by collecting a voice by a microphone with a VOX sensitivity level;
a transmission determination unit configured to instruct the transmitter to transmit the input voice signal, when the level of the input voice signal is equal to or greater than the VOX sensitivity level, based on a comparison result by the voice level comparator; and
a VOX sensitivity level calculator configured to calculate the VOX sensitivity level in a predetermined period until just before the receiver completes outputting the output voice signal, based on an ambient sound collected by the microphone,
wherein the VOX sensitivity level calculator calculates a first VOX sensitivity level and a second VOX sensitivity level which is smaller than the first VOX sensitivity level, as the VOX sensitivity level,
and wherein the radio communication device further comprises:
an elapsed time measurement unit configured to measure an elapsed time from a point of time when the receiver completes outputting the output voice signal; and
a VOX sensitivity level selector configured to select the second VOX sensitivity level until the elapsed time measured by the elapsed time measurement unit reaches a predetermined time, and to select the first VOX sensitivity level when the elapsed time measured by the elapsed time measurement unit exceeds the predetermined time, as the VOX sensitivity level that is compared with the level of the input voice signal by the voice level comparator.

2. The radio communication device according to claim 1, wherein
the VOX sensitivity level calculator is configured,
to set an added value obtained by adding a predetermined offset value to an average value to the first VOX sensitivity level, when a subtraction value obtained by subtracting the average value from a maximum value exceeds a threshold value, the average value and the maximum value being obtained in a predetermined time of the input voice signal,
and to set an added value obtained by adding a predetermined offset value to the maximum value to the first VOX sensitivity level, when the subtraction value does not exceed the threshold value.

* * * * *